United States Patent [19]

Jackson

[11] 4,278,835

[45] Jul. 14, 1981

[54] SUBMARINE COMMUNICATION CABLE INCLUDING OPTICAL FIBRES WITHIN AN ELECTRICALLY CONDUCTIVE TUBE

[75] Inventor: Lynden A. Jackson, Ipswich, England

[73] Assignee: The Post Office, London, England

[21] Appl. No.: 969,574

[22] Filed: Dec. 14, 1978

[30] Foreign Application Priority Data

Dec. 16, 1977 [GB] United Kingdom ............... 52509/77

[51] Int. Cl.³ .............................................. G02B 5/14
[52] U.S. Cl. .............................. 174/70 R; 174/106 R; 174/107; 350/96.23
[58] Field of Search ................. 174/70 R, 23 R, 23 C, 174/106 R, 107, 108, 115; 350/96.23

[56] References Cited

U.S. PATENT DOCUMENTS

| 4,038,489 | 7/1977 | Stenson et al. | 174/70 R |
| 4,072,398 | 2/1978 | Larsen et al. | 350/96.23 |
| 4,110,001 | 8/1978 | Olszewski et al. | 350/96.23 |
| 4,146,302 | 3/1979 | Jachimowicz | 350/96.23 |
| 4,156,104 | 5/1979 | Mondello | 350/96.23 X |

FOREIGN PATENT DOCUMENTS

| 2635979 | 2/1978 | Fed. Rep. of Germany | 350/96.23 |
| 2265108 | 10/1975 | France | 350/96.23 |
| 52-10738 | 1/1977 | Japan | 350/96.23 |
| 1172272 | 11/1969 | United Kingdom | 350/96.23 |
| 1438074 | 6/1976 | United Kingdom | 350/96.23 |
| 1445732 | 8/1976 | United Kingdom | 350/96.23 |
| 1461151 | 1/1977 | United Kingdom | 350/96.23 |
| 1462160 | 1/1977 | United Kingdom | 350/96.23 |
| 1477294 | 6/1977 | United Kingdom | 350/96.23 |
| 1479426 | 7/1977 | United Kingdom | 350/96.23 |
| 1479427 | 7/1977 | United Kingdom | 350/96.23 |
| 1487464 | 9/1977 | United Kingdom | 350/96.23 |

Primary Examiner—Laramie E. Askin
Attorney, Agent, or Firm—Kemon & Estabrook

[57] ABSTRACT

A submarine communications cable comprising a plurality of optical fibres extending longitudinally, an electrically conductive tube surrounding the plurality of fibres with radial clearance, the electrically conductive tube allowing the transmission of electrical power between repeaters and being rigid so that when incorporated in the cable it resists hydrostatic pressure at the sea bed.

3 Claims, 1 Drawing Figure

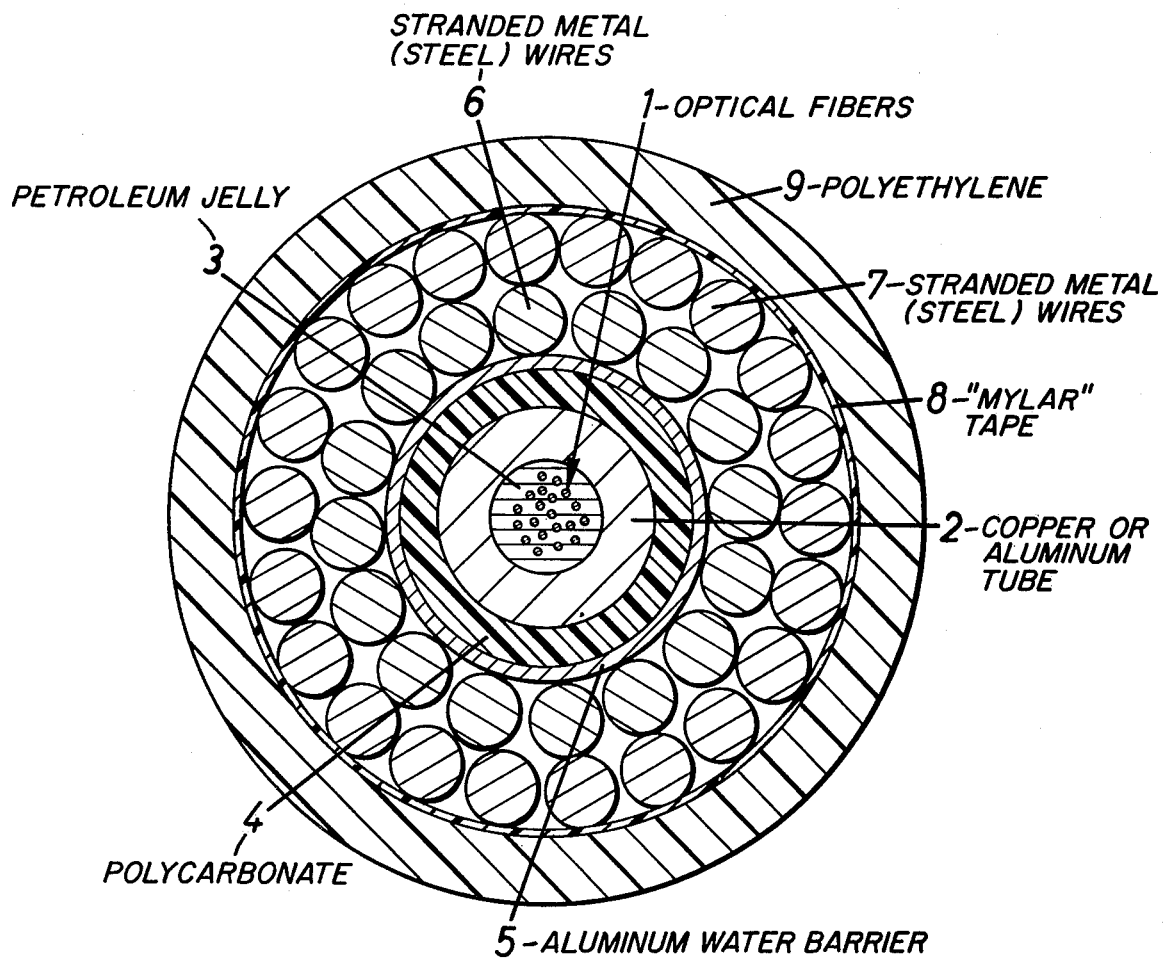

SUBMARINE COMMUNICATION CABLE INCLUDING OPTICAL FIBRES WITHIN AN ELECTRICALLY CONDUCTIVE TUBE

DESCRIPTION

The present invention is concerned with cables for underwater use herein referred to as submarine cables. The objective of the invention is to provide a submarine cable incorporating dielectric optical waveguides hereinafter referred to as optical fibres.

In accordance with the present invention there is provided a submarine communications cable comprising a plurality of optical fibres extending longitudinally, an electrically conductive tube surrounding the plurality of fibres with radial clearance, the electrically conductive tube allowing the transmission of electrical power between repeaters and being rigid so that when incorporated in the cable it resists hydrostatic pressure at the sea bed.

In a cable in accordance with the present invention the or each optical fibre is positioned as a loose fit within the electrically conductive tube near the neutral axis of the cable and during bending is not subjected to tension or compression. Additionally along the axis of the cable it is more likely that a system of pure hydrostatic pressure will prevail on the loose and unconstrained fibres. The loose fit moreover provides mechanical isolation of the fibres from the cable and loss from distortion of the fibres is minimised.

The tube is preferably made of metal such as copper or aluminium.

The interior of the tube housing the fibres is preferably filled with a fluid material such as petroleum jelly which resists the ingress of water in the event of a leak. The use of a jelly moreover enhances the isolation of the fibres achieved by the loose fit as set out above. The properties of petroleum jelly which make it a suitable fluid material are water resistance, high bulk modulus, reasonable but not excessive flowability, if necessary heat enhanced, and a good vibration damping characteristic. Other fluids having these characteristics can be used. A further advantage of filling the tube with jelly is that the resistance of the tube to hydrostatic pressure is increased. In these circumstances a lighter gauge of tube can be used than would otherwise be necessary.

A particular cable in accordance with the present invention will now be described by way of example and with reference to the accompanying drawing which is a cross-sectional view of the cable.

A group of twenty optical fibres 1 has its centre extending substantially along the longitudinal axis of the cable. A copper or aluminium electrically conductive tube 2 of circular cross section surrounds the fibres with radial clearance. The space within the tube in which the fibres 1 are located is filled with petroleum jelly 3 to prevent the ingress of water in the event of a leak. The loose fit of the fibres 1 within the sheath 2 in addition to providing the advantages set out above allows additional fibres to be inserted. A layer 4 of polycarbonate material providing dielectric insulation and strength surrounds the sheath 2. An aluminium water barrier 5 surrounds the layer 4. This barrier 5 serves two functions; firstly to prevent the ingress of moisture which lowers the dielectric strength of the polycarbonate and secondly to assist in the spreading of radial loads in the cable. The aluminium water barrier layer 5 is surrounded by a protective sheath comprising a first and inner layer of stranded metal wires 6 and the said first layer being surrounded by a second and outer layer of stranded wires 7 of opposite lay. A MYLAR wrapping tape layer 8 surrounds the two layers of stranded wires and finally a polyethylene outer sheath 9 is fitted. In an embodiment of the invention the clearance between the individual wires of the first layer 6 is made sufficiently small that under tensile and hydrostatic pressure conditions the radially outer cables 7 press radially inwardly against the inner cables so that a rigid tubular outer casing is provided. The MYLAR tape is not essential but helps to maintain register under bending during manufacture and loading into the ship.

For special applications a further layer of steel wires is added before the polyethylene outer sheath is fitted.

In an exemplary communications cable the following cable parameters are required:
1. modulus of cable $\geq$ 10 tons for 1% extension
2. maximum cable diameter $\leq$ 30 mm
3. approximate power feed voltage for long-haul systems $\leq$ 15 kv each end
4. cable strength $\geq$ 20 tons
5. 40 km spacing between repeater stations
6. 10 W/bW repeater
7. maximum capacity 20,000 bW channels For this requirement cable dimensions as follows are provided:
1. electrically conductive tube of copper 3 mm inner diameter, 6 mm outer diameter, of aluminium 3 mm inner diameter, 6.5 mm outer diameter
2. extruded layer of polycarbonate 2 mm thick
3. aluminium water barrier 0.5 mm thick
4. inner layer of stranded steel wires 2 mm diameter on a 50 cm pitch pretensioned
5. outer layer 1 of stranded steel wires 2 mm diameter of opposite lay. Pitch chosen to balance cable for torsion
6. Mylar wrapping tape approximately 100$\mu$ thick
7. polyethylene sheath 2 mm thick.

I claim:

1. A submarine communication cable comprising a tubular sheath of electrically conductive metal, jelly material within said sheath and a plurality of longitudinally extending optical fibers within the jelly-filled sheath each fiber being unconstrained and radially spaced from the sheath wall.

2. A submarine communication cable comprising a tubular sheath of electrically conductive metal, jelly material within said sheath, a plurality of longitudinally extending optical fibers within the jelly-filled sheath each fiber being unconstrained and radially spaced from the sheath wall, a dielectric insulating layer surrounding said sheath, a water barrier surrounding the dielectric insulating layer and a tubular outer casing of stranded wires surrounding said water barrier.

3. A cable as claimed in claim 2 wherein said tubular outer casing is made up of radially inner and outer layers of stranded metal wires, the arrangement being such that when the cable is laid on the sea bed the cable layers are pressed together thereby rendering the cable rigid.

* * * * *